TAPE RETAINING AND IDENTIFICATION MEANS FOR TAPE REELS
Filed March 16, 1955
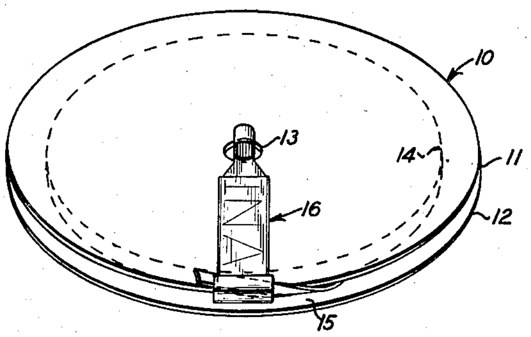
Fig. 1
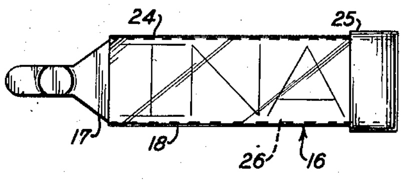
Fig. 2
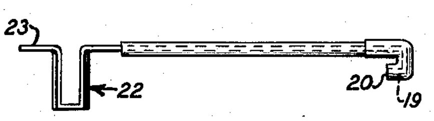
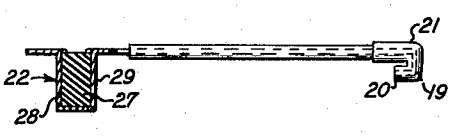
Fig. 3 Fig. 4
INVENTOR
THOMAS S. KULKA
BY *[signature]*
ATTORNEY 2,838,167
Patented June 10, 1958

2,838,167

TAPE RETAINING AND IDENTIFICATION MEANS FOR TAPE REELS

Thomas S. Kulka, Cleveland, Ohio

Application March 16, 1955, Serial No. 494,770

2 Claims. (Cl. 206—54)

This invention relates to the utilization and storage of tapes commonly employed in the magnetic recording of sound or for film used in motion pictures and more particularly to a device for preventing inadvertent unwinding of the tape from a reel and for identifying such reel and the tape carried thereby.

The use of tape coated with a magnetic substance for recording sound has increased to a remarkable extent over the past few years, and in order to prevent damage to the tape which is commonly stored on reels, it is imperative that some means be provided to prevent inadvertent unwinding of the tape therefrom. This means should be relatively inexpensive and should be capable of application to the reel with a minimum of effort and, at the same time, provide an effective means for holding the tape against unwinding and without damage to such tape or the reel upon which the same is wound. Furthermore it is highly desirable that means be provided for permitting convenient identification of the material recorded on the particular tape and since the material on a tape at a given time may be erased, and other or different material recorded thereon, some identification means, which may be conveniently changed from time to time, is highly desirable.

It is accordingly an object of the invention to provide a tape retaining and identification means for tape reels which may be conveniently and economically manufactured from readily available materials and conveniently applied to a reel of tape to securely hold such tape and prevent inadvertent unwinding thereof.

A further object of the invention is the provision of a tape winding and identification means for tape reels which is of relatively lightweight and small size and which does not materially increase the space occupied by the reel of tape.

A still further object of the invention is the provision of a tape retaining and identification means for tape reels incorporating a removable card upon which information may be recorded indicating the nature of the tape or the program material thereon which is wound on that particular reel.

Another object of the invention is the provision of a tape retaining and identification means for tape reels which may be conveniently applied to a reel of tape without the use of tools and which will remain securely in place during any normal handling of the reel.

A further object of the invention is the provision of tape retaining and identification means for tape reels, so constructed as to prevent damage to either the tape or the reel upon which such tape is wound.

Further objects and advantages of the invention will be apparent from the following description taken in conjunction with the accompanying drawing wherein:

Fig. 1 is a view in perspective showing a tape reel with tape applied thereto and with the retaining and identification means of this invention in place on such reel;

Fig. 2 is a top plan view of the tape retaining and identification means of this invention;

Fig. 3 is a side elevational view of the device shown in Fig. 2; and

Fig. 4 is a side elevational view similar to Fig. 3, but showing a slightly modified form of the device of this invention.

With continued reference to the drawing there is shown a reel 10 of more or less conventional construction, which may well comprise spaced flanges 11 and 12 formed of any suitable material, such as plastic or the like, and which is normally provided with a centrally located spindle receiving aperture 13. While the flanges 11 and 12 are normally supplied of a diameter to accommodate the desired length of tape when the reel is substantially filled, obviously it is highly desirable that a shorter length of tape may be wound on the reel and securely held against inadvertent unwinding therefrom. As shown in Fig. 1, in dotted lines, a quantity of tape 14 of the type commonly employed for magnetic recordings is wound on the reel and the end 15 of this tape extends outwardly of the flanges 11 and 12 and is retained in place by the retaining means of this invention, the structure and operation of which will now be described.

The retaining means 16 of this invention may well comprise an elongated, substantially flat strip 17 of resilient material, such as metal, plastic or the like, and the central portion 18 of such strip is substantially rectangular in shape and terminates at the outer end in a hook 19. The inner end 20 of the hook 19 is spaced from the portion 18 of the strip 17, a distance slightly greater than the thickness of one of the flanges 11 or 12 of the reel 10 and the inner end 20 of the hook 19 is of sufficient length to extend under one of the flanges and prevent inadvertent removal of the retaining means when applied to the reel 10 in a manner to be later described. A sleeve 21 of suitable yieldable material, such as rubber, plastic or the like, is received over the hook 19 and extends inwardly over the central portion 18 of the strip 17, a distance slightly greater than the width of the tape 14 carried by the reel 10.

The inner end of strip 17 is provided with an integral U-shaped plug 22 which is adapted to be frictionally received in the spindle receiving aperture 13 of the reel 10. The U-shaped plug 22 may terminate in a lip 23, which may be conveniently utilized to facilitate removal of the tape retaining device from the reel 10.

Received over the central portion 18 of the strip 17 is a sleeve 24 of suitable transparent material, such as plastic or the like, and removably received between such sleeve 24 and the surface of the central portion 18 of the strip 17, is a card 25 bearing suitable indicia 26 thereon, which serves to indicate the material recorded on the tape 14 carried by the reel 10. The card 25 may be conveniently removed from beneath the transparent sleeve 24 toward the end of the strip 17 adjacent the U-shaped plug 22 and the indicia on such card 25 changed, as may be necessitated by a change in the material recorded on the tape 14. The card 25 may then be conveniently reinserted beneath the sleeve 24 and there is sufficient friction to retain card 25 therein, against inadvertent displacement.

While the U-shaped plug 22 normally provides a sufficient frictional engagement with the spindle receiving aperture 13 to retain the device of this invention in place, in certan instances it may be desirable to reinforce such resilient plug 22, and consequently, as shown in Fig. 4, there may be provided a body 27 of rubber or other suitable yieldable material, filling the space between the legs 28 and 29 of the U-shaped plug 22, thereby reinforcing such legs 28 and 29 and preventing inadvertent bending of these legs inwardly, which would prevent obtaining a tight fit between such legs and the wall of the spindle receiving aperture 13.

In use it is only necessary to bring the end 15 of the tape 14 over the side of the flange 11, as shown in Fig. 1, and hold the same in place with the thumb of one hand, while the hook 18 is applied to the peripheral edge of the flange 11 with the end 15 of the tape 14 positioned between the yieldable sleeve 21 and the surface of the flange 11. At this time, the plug 22 is forced into the spindle receiving aperture 13 and effectively retains the device in place on the reel 10. The yieldability of the sleeve 21 operates to securely clamp the end 15 of the tape 14 to the surface of the flange 11 and thereby prevents inadvertent unwinding of the tape 14 from such reel. It is to be noted that this retaining device operates equally well, whether the tape 14 substantially fills the reel 10 or whether the reel is only partially filled by such tape. Furthermore, only the end 15 of the tape 14 is engaged by the retaining means and since normally a sufficient length of unrecorded portion of the tape is provided for threading the same through a recording apparatus, there is no danger of damaging the recorded portion of such tape.

It will be obvious that, by the above described invention, there has been provided a relatively simple and inexpensive, yet highly efficient, retaining and identification means for preventing inadvertent unwinding of tape from a reel and one which may be conveniently utilized, whether the reel is substantially filled or only partially filled with tape. Furthermore, the device provides a convenient identification means for the material recorded on the tape and such identification may be conveniently changed as occasion may require. The device requires no particular skill or dexterity in use and will not become inadvertently displaced during normal handling or use of the tape receiving reel.

It will be obvious to those skilled in the art that various changes may be made in the invention without departing from the spirit and scope thereof and therefore the invention is not limited by that which is shown in the drawing and described in the specificaton, but only as indicated in the appended claims.

What is claimed is:

1. Tape retaining means for tape reels having substantially circular spaced flanges and a substantially centrally disposed aperture, said means comprising an elongated strip, a hook at the outer end of said strip, said hook comprising a portion extending at right angles to said strip, which merges into a terminal portion that extends parallel to said strip, a sleeve of yieldable material received over said hook and extending inwardly on said strip and a resilient plug at the inner end of said strip, said plug being substantially cylindrical and having a diameter less than the width of said strip, said plug being joined to said strip along a line that extends substantially at right angles to the direction of longitudinal extent of said elongated strip, whereby with the hook engaged over the peripheral edge of one of said flanges and with said plug inserted in said aperture the end of the tape carried by said reel may be clamped between said yieldable sleeve and the surface of said flange to prevent unwinding of said tape, whether the reel be filled with said tape or partially filled thereby.

2. Tape retaining means for tape reels having substantially circular spaced flanges and a substantially centrally disposed aperture, said means comprising an elongated strip, a hook at the outer end of said strip, said hook comprising a portion extending at right angles to said strip, which merges into a terminal portion that extends parallel to said strip, and a plug at the inner end of said strip, said plug being substantially cylindrical and having a diameter less than the width of said strip, said plug being joined to said strip along a line that extends substantially at right angles to the direction of longitudinal extent of said elongated strip, whereby with said hook engaged over the peripheral edge of one of said flanges and with said plug inserted in said aperture the end of the tape carried by said reel may be clamped between said strip and the surface of said flange to prevent unwinding of said tape, whether the reel be filled with said tape or partially filled thereby.

References Cited in the file of this patent

UNITED STATES PATENTS

| | | |
|---|---|---|
| 848,644 | Flegel | Apr. 2, 1907 |
| 2,236,938 | Edelen | Apr. 1, 1941 |
| 2,273,701 | Funke | Feb. 17, 1942 |
| 2,347,144 | Wilson | Apr. 18, 1944 |
| 2,533,819 | Kronfield | Dec. 12, 1950 |
| 2,690,624 | Phillips | Oct. 5, 1954 |